United States Patent Office 3,033,744
Patented May 8, 1962

3,033,744
THIOPHOSPHATE ESTERS, THEIR INSECTICIDAL APPLICATION, AND PROCESS OF PREPARATION
Giuseppe Losco, Giorgio Rossi, and Giannantonio Michieli, Milan, Italy, assignors to Montecatini Società Generale per l'Industria Mineraria e Chimica, Milan, Italy, a corporation of Italy
No Drawing. Filed Dec. 29, 1960, Ser. No. 79,184
Claims priority, application Italy Dec. 30, 1959
15 Claims. (Cl. 167—22)

The present invention relates to a new class of thiophosphate esters, having the general formula:

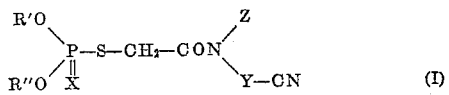

wherein R' and R" are alkyl radicals having a low molecular weight, i.e. not more than six carbon atoms each, R' being different from or the same as R", X is an oxygen or sulfur atom; Z is hydrogen or a low molecular weight alkyl radical and Y is a short straight or branched aliphatic hydrocarbon chain preferably having no more than six carbon atoms. The compounds included in the above general Formula I have outstanding insecticidal activity both with respect to domestic parasites (for instance, flies) and with respect to agricultural pests (for instance, aphids). Another interesting property of these compounds is their activity against mites in their various stages of development, as well as against their eggs.

They can be used in various ways. Generally, it is better to dilute them with solid, liquid or semisolid carriers, adding wetting, adhesive, dispersing or emulsifying substances.

They can also be distributed in air by fumigation, or in the form of aerosols. Other compounds having an insecticidal activity (such as phosphoric esters, DDT and gammahexane) can also be added to the thiophosphate esters of the invention.

The compounds having the general Formula I may be prepared by reacting a salt of a corresponding dialkylthio- or dialkyldithio-phosphoric acid having the general formula

wherein R', R" and X are defined above and Me is an alkaline metal (for instance, sodium or potassium) or ammonium, with an alkylamide of a monohalogenated acetic acid, having the general formula:

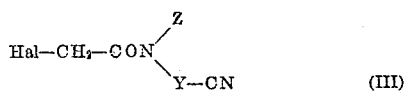

wherein Z and Y are as defined above and Hal is a chlorine, bromine or iodine atom.

Said halogen compounds can be obtained by reacting a cyanoalkylamine with a haloacetylating agent (for instance, monochloroacetylchloride or monochloroacetic anhydride).

The reaction is preferably carried out in the presence of a solvent for one or both reagents. Very suitable for this purpose are, for instance, low molecular weight (preferably no more than five carbon atoms) aliphatic ketones which allow separation of the by-products and facilitate the separation of the end product. Reaction takes place at room temperature but may be carried out at 10° to 100° C.; in certain cases it is convenient to heat, for a short time, to 50–60° C.

Sometimes it may be convenient to use more than the stoichiometric quantity of one reagent.

The halide compound, which is formed as by-product, can be removed either by filtration or (when the final product is insoluble in water) by adding water causing the dissolution of the inorganic salt and of the eventual excess of metallic phosphate, as well as the simultaneous precipitation of the end product.

The separation of the end product can also be carried out by other known methods (solvent extraction, concentration, crystallization or chromatographic column).

The products having the general Formula I are oily liquids or, in certain cases, crystalline products soluble in common organic solvents.

Some of these products, generally the monothio-derivatives, have good solubility in water, which is useful for certain applications. The invention is illustrated but not limited by the following examples.

EXAMPLE 1

36 g. of de-hydrated sodium O,O-dimethyldithiophosphate and 20 g. of N-cyanomethylamide of monochloroacetic acid are mixed in 80 ml. of acetone. The reaction mixture is then heated to 50–60° C. and kept at room temperature for 3 hours, while frequently agitating it. The major part of the solvent is subsequently evaporated under reduced pressure and the residue is poured into 80 ml. H$_2$O, wherefrom it is mixed again with 50 ml. of methylene chloride and subsequently washed twice with H$_2$O (40 ml.). It is then dried on MgSO$_4$ and evaporated under reduced pressure. The raw material thus obtained is purified, the by-products being removed by continuous extraction with n-hexane.

By maintaining the residue under vacuum until a constant weight was reached, 26.5 g. of product are obtained in the form of a straw-colored limpid oil, which solidifies, after a short time, at room temperature, yielding crystals having an M.P. 38–40° C. (after crystallization from ethyl acetate and petroleum ether), of the following formula:

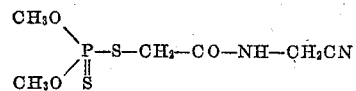

N calculated=11.02%. N found=11.04 to 11.00%.

EXAMPLE 2

20 g. N-cyanomethylamide of monochloroacetic acid (melting point 89 to 89.5° C.) are added to a solution of 37 g. potassium O,O-diethyldithiophosphate dissolved in 80 ml. of acetone.

The reaction is slightly exothermic and rapid precipitation of KCl takes place. After leaving it at room temperature for 2 hours, the reaction mixture is poured into half a liter of H$_2$O, under agitation. An oily compound separates, which solidifies completely after a short time. The compound, filtered by aspiration and thoroughly washed with water, yields a white powder having a melting point of 70–71° C. The product obtained is subsequently dissolved, at mild heat, in 70 ml. of ethyl acetate. By adding 100 ml. of petroleum ether and allowing it to crystallize, 31 g. of a solid colorless crystalline product are obtained having a melting point of 71.5 to 72° C. and consisting of N-cyanomethylamide of O,O-diethyldithiophosphorylacetic acid of the following formula:

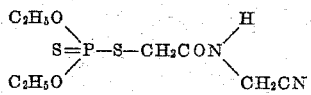

N calculated=9.92%. N found=9.66 to 9.65%.

EXAMPLE 3

20.8 g. of potassium O,O-diethylmonothiophosphate and 13.2 g. of N-cyanomethylamide of monochloroacetic acid (melting point 89 to 89.5° C.) are mixed in 60 ml. of acetone. The mixture is slightly warmed up to favor the dissolution of the reagents and is then left to stand for 2 hours. It is then heated with weak refluxing of the solvent for 30 minutes, cooled and filtered by aspiration in the presence of a coadjuvant (for instance, Celite). The limpid filtrate is evaporated until a constant weight was reached under reduced pressure.

28 g. of a limpid straw-colored oil remain consisting of N-cyanomethylamide of O,O-diethylmonothiophosphorylacetic acid of the following formula:

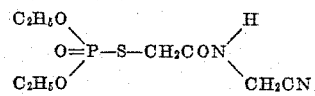

N calculated=10.52%. N found=9.91 to 9.88%.

EXAMPLE 4

36.5 g. of di-hydrated crystalilne sodium O,O-dimethyldithiophosphate and 19 g. of N-methyl-N-cyanomethylamide of chloroacetic acid (boiling point at 0.4 to 0.5 mm. Hg=135 to 140° C.) are mixed with 60 ml. of acetone; the reaction is slightly exothermic. The reaction mixture is left to stand for 15 hours and then kept under reduced pressure in order to evaporate most of the solvent. The residue is poured into water, taken again with methylene chloride and washed with water.

Operating substantially as described in Example 1, 24 g. of the desired product consisting of N-methyl-N-cyanomethylamide of O,O - dimethyldithiophosphorylacetic acid, of the following formula:

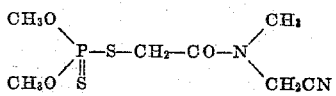

are obtained in the form of an oily liquid. N calculated=10.44%. N found=9.80 to 9.60%.

EXAMPLE 5

35 g. of potassium O,O-diethyldithiophosphate and 19 g. of N-methyl-N-cyano-methylamide of chloroacetic acid (boiling point at 0.4 to 0.5 mm. Hg=135 to 140° C.) are mixed in 70 ml. of acetone. The reaction is highly exothermic. The mixture is left to stand for 15 hours and then the KCl formed is filtered off. The filtrate is then evaporated under reduced pressure. The residue, diluted with a small amount of methyl chloride, is then washed with $H_2O$. The organic solution, after drying, is evaporated under reduced pressure. 35 g. of an oily liquid which remain as residue consist of the N-methyl-N- cyanomethylamide of O,O-diethyldithiophosphorylacetic acid, and correspond to the following formula:

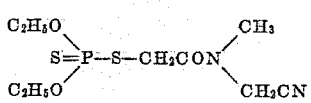

EXAMPLE 6

27.2 g. of potassium O,O-diethylmonothiophosphate and 19 g. of N-methyl-N-cyanomethylamide of chloroacetic acid are mixed in 70 ml. of acetone.

The reaction mixture is slightly warmed and then left standing for 15 hours.

After filtering in the presence of a coadjuvant (for instance, Celite), the limpid filtrate is concentrated under reduced pressure until a constant weight is reached. 39 g. of a straw-colored oil remain as residue consisting of N-cyano-methyl-N-methylamide of O,O-diethylmonothiophosphoryl acetic acid, having the following formula:

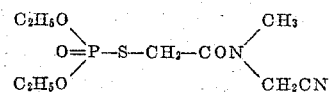

EXAMPLE 7

52 g. of crystalline di-hydrated sodium O,O-dimethyldithiophosphate and 32.1 g. of raw N-ethyl-N-cyanomethylamide of chloroacetic acid are reacted at room temperature in 100 ml. of acetone. After 3 days the solvent is evaporated and the residue is poured into 150 ml. of $H_2O$, whereafter it is taken up again with 75 ml. of $CH_2Cl_2$ and then washed with $H_2O$. After drying and evaporation of the solvent, 38 g. of a liquid straw-colored oil are obtained which, when further purified by continuous washing with n-hexane, is reduced to 28.5 g. This product consists of N-cyanomethyl-N-ethylamide of O,O-dimethyldithiophosphorylacetic acid of the following formula:

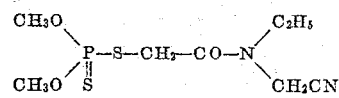

N calculated=9.92%. N found=9.53 to 9.48%.

EXAMPLE 8

24.6 g. of potassium O,O-diethyldithiophosphate and 16 g. of raw undistilled N-ethyl-N-cyanomethylamide of chloroacetic acid are mixed in 60 ml. of acetone. Reaction occurs with moderate development of heat. The mixture after standing for 2 hours, is filtered by aspiration from KCl and after evaporating most of the acetone under reduced pressure, the remaining residue is poured into $H_2O$. The organic phase, after diluting with a small quantity of methylene chloride, is washed again with $H_2O$. Upon evaporation of the solvent under reduced pressure, 29 g. of N-ethyl-N-cyanomethylamide of O,O-diethyldithiophosphorylacetic acid having the following formula:

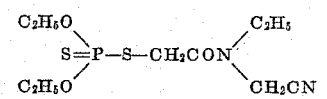

are obtained in the form of a limpid yellow colored oil. N calculated=9.02%. N found=8.65 to 8.69%.

EXAMPLE 9

20.8 g. of potassium O,O-diethylmonothiophosphate and 16 g. of raw N-ethyl-N-cyanomethylamide of chloroacetic acid are reacted in 60 ml. of acetone. The mixture after slight warming is left to stand for 1 hour, and then heated under mild refluxing for half an hour. In order to separate KCl the mixture is subsequently filtered in the presence of a coadjuvant (for instance Celite) and concentrated under reduced pressure until constant weight is reached, thus obtaining 29 g. of N-ethyl-N-cyanomethylamide of O,O-diethylmonothiophosphorylacetic acid, in the form of a light yellow oil, having the following formula:

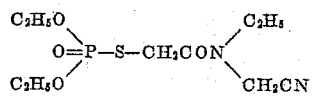

EXAMPLE 10

24 g. of chloroacetic N-methyl-N-beta-cyanoethylamide (boiling point at 0.2 mm. Hg=147° C.) are added to 75 ml. of a water solution of sodium O,O-dimethyldithiophosphate (concentration 2.5 mol/liter) while mechanically agitating the mixture. The temperature rises spontaneously up to about 45° C. After agitating for 24 hours the reaction mixture is extracted with 100 ml. of $CH_2Cl_2$. The organic extract is washed twice with a total amount of 80 ml. $H_2O$, then dried and evaporated under reduced pressure. The residue is purified by continuous washing with n-hexane.

After treatment under reduced pressure, 26.7 g. of N-methyl-N-beta-cyanoethylamide of O,O-dimethyldithiophosphorylacetic acid are obtained in the form of an oily liquid, having the following formula:

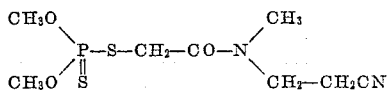

N calculated=9.92%. N found=9.32 to 9.29%.

EXAMPLE 11

37 g. of potassium O,O-diethyldithiophosphate and 24 g. of chloroacetic N-methyl-N-beta-cyanomethylamide (boiling point at 0.2 mm. Hg=147° C.) are reacted in 75 ml. of acetone. The reaction is so exothermic as to heat the mixture to a temperature at which the solvent is refluxed. After standing for 24 hours, most of the acetone is evaporated under reduced pressure, and the residue is poured into 100 ml. of $H_2O$, wherefrom it is mixed with 60 ml. of $CH_2Cl_2$. The organic phase is then washed twice with 50 ml. of $H_2O$. After drying and evaporating under reduced pressure, 40.5 g. N-methyl-N-beta-cyanoethylamide of O,O-diethyldithiophosphorylacetic acid are obtained in the form of a colorless limpid oil, of the following formula:

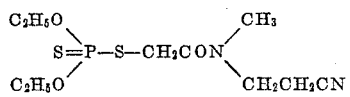

P calculated=9.99%. P found=9.35 to 9.32%.

EXAMPLE 12

21 g. of potassium O,O-diethylmonothiophosphate and 16 g. of chloroacetic N-methyl-N-beta-cyanoethylamide (boiling point at 0.2 mm. Hg=147° C.) are reacted in 60 ml. of acetone.

After warming, the mixture is left to stand for 15 hours. The mixture is then filtered by aspiration in the presence of a coadjuvant (for instance, Celite) and evaporated under reduced pressure, thus obtaining as residue 29.5 g. of N-methyl-N-beta-cyanoethylamide of O,O-diethylmonothiophosphorylacetic acid, in the form of a limpid oil, of the following formula:

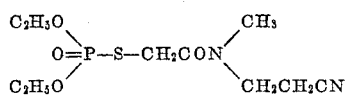

N calculated =9.52%. N found=9.16 to 9.17%.

EXAMPLE 13

48 g. of crystallized di-hydrated sodium O,O-dimethyldithiophosphate and 32 g. of N-alpha-cyano-isopropylamide of monochloroacetic acid (melting point 87 to 88° C.) are reacted in 80 ml. of acetone, heating initially to 40–50° C. After 3 hours most of the acetone is evaporated under reduced pressure, and the remainder is poured into 100 ml. of $H_2O$, wherefrom it is taken up again with 80 ml. of $CH_2Cl_2$, then washed twice with 50 ml. of $H_2O$, dried and evaporated under vacuum. The residue, consisting of a colorless limpid oil, is then purified by continuous washing with n-hexane. This residue, after treatment under vacuum, consists of 32 g. of a partially crystallized solid, having a melting point between 45 and 55° C., from which the desired product N-(alpha-cyano)-isopropylamide of O,O-dimethyldithiophosphorylacetic acid having the formula:

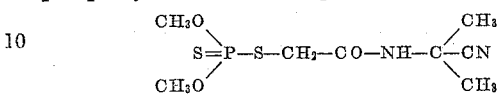

can be obtained. The pure product has a melting point of 57 to 59° C. (from ethyl acetate and petroleum ether). N calculated=9.92%. N found=9.89 to 9.70%.

EXAMPLE 14

31 g. of potassium O,O-diethyldithiophosphate and 20 g. of chloroacetic N-(alpha-cyano)-isopropylamide (melting point 86 to 88° C.) are reacted in 80 ml. of acetone. After heating initially up to about 50° C., the mixture is left to stand for half an hour at room temperature.

The reaction mixture is poured into 500 ml. of iced water and the separating crystalline solid is filtered off and thoroughly washed with $H_2O$. There is obtained 29 g. of N-(alpha-cyano)isopropylamide of O,O-diethyldithiophosphorylacetic acid having the following formula:

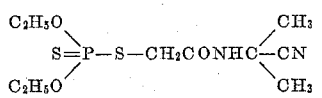

in the form of a white crystalline solid having a melting point of 83 to 83.5° C. (from ethyl acetate and petroleum ether). N calculated=9.02%. N found=9.00 to 8.98%.

EXAMPLE 15

20.8 g. of potassium O,O-diethylmonothiophosphate and 16 g. of chloroacetic N-(alpha-cyano)isopropylamide are reacted in 60 ml. of acetone. After heating initially to about 50° C., the mixture is left to stand for 15 hours. The mixture is then filtered by aspiration in the presence of a coadjuvant (for instance Celite). The limpid filtrate, when evaporated under reduced pressure until a constant weight is reached, yields 29 g. of N-(alpha-cyano)isopropylamide of O,O - diethylmonothiophosphorylacetic acid, of the following formula:

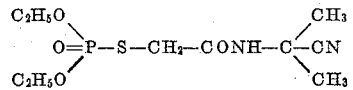

in the form of a yellow limpid oil. N calculated=9.52%. N found=9.13 to 9.12%.

EXAMPLE 16

34.6 g. of potassium O-methyl-O-ethyl-dithiophosphate and 19.9 g. of N-cyano-methylamide of monochloroacetic acid are mixed in 120 ml. of acetone; the mixture thus obtained is refluxed for 20 minutes and then left to stand for 15 hours. After this period the precipitated KCl is separated by filtration and most of the solvent is evaporated under reduced pressure. The residue is poured into 150 ml. of water, taken up again with 60 ml. of methylene chloride and washed twice with water (50 ml. each time). After drying on $CaCl_2$ and evaporation of the solvent under reduced pressure, 32 g. of a slightly opalescent colorless oil which solidifies after a short time in the form of a waxlike solid, are obtained as a residue.

The product, crystallized from diluted methanol, and having a melting point of 54–58° C., substantially consists of N-cyano-methylamide of O-methyl-O-ethyl-dithiophosphorylacetic acid, having the formula:

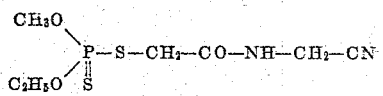

P calculated=11.55%. P found=11.12%–11.07%.

EXAMPLE 17

34.6 g. of potassium O-methyl-O-ethyl-dithiophosphate and 24 g. of N-ethyl-N-cyanomethylamide of monochloroacetic acid are mixed in 120 ml. of acetone; the reaction is mildly exothermic. By operating substantially as described in Example 16, 30 g. of a light wellow oil ($D_4^{20}=1200$; $n_D^{20}=1.5262$) are obtained. It consists substantially of N-ethyl-N-cyanomethylamide of O-methyl-O-ethyl-dithiophosphorylacetic acid, having the formula:

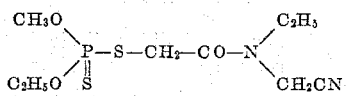

P calculated=10.46%. P found=10.72–10.69%.

EXAMPLE 18

34.6 g. of potassium O-methyl-O-ethyl-dithiophosphate and 24 g. of N-methyl-N-beta-cyanoethylamide of monochloroacetic acid are mixed in 150 ml. of acetone; the reaction is mildly exothermic. By operating substantially as described in Example 16, 41.5 g. of a colorless oil, having a specific gravity of $D_4^{20}=1.248$ and an index of refraction of $n_D^{20}=1.5353$, are obtained. The oil consists substantially of N-methyl-N-beta-cyanoethylamide of O-methyl-O-ethyl-dithiophosphorylacetic acid, of the formula:

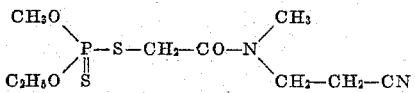

P calculated=9.46%. P found=8.84–8.75%.

EXAMPLE 19

23.1 g. of potassium O-methyl-O-ethyl-dithiophosphate and 16 g. of N-alpha-cyanoisopropylamide of monochloroacetic acid are mixed in 100 ml. of acetone. By operating substantially as described in Example 16, 25 g. of an oil having $D_4^{20}=1.223$ and $n_D^{20}=1.5233$, are obtained. This oil consists substantially of N-(alpha-cyano)-isopropylamide of O-methyl-O-ethyl-dithiophosphorylacetic acid, of the formula:

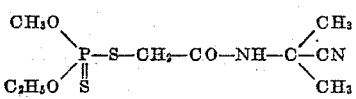

P calculated=10.46%. P found=10.51%–10.47%.

The specific activity of the compounds obtained in Examples 1 to 19 is illustrated by the following examples:

EXAMPLE 20

Activity against domestic fly by topic application: The doses necessary to obtain a 50% death rate with acetone solutions of the active products on 5-day old female flies, in tests of topic application by microsyringe, are as follows:

| Product obtained in the example: | LD 50, γ/fly |
|---|---|
| 1 | 0.08 |
| 2 | 0.26 |
| 3 | 0.21 |
| 4 | 0.068 |
| 5 | 0.205 |
| 6 | 0.1 |
| 8 | 0.48 |
| 9 | 0.85 |
| 10 | 3.5 |
| 11 | 2.1 |
| 13 | 3.0 |
| 15 | 4.2 |

Activity against *Aphis fabae*: The concentrations necessary to obtain a 95% death rate, upon testing plants infested with parthenogenetic apter females of *Aphis fabae*, bred with artificial light, and treating under standardized conditions with aqueous dispersions of the active products suitably formulated are as follows.

| Product obtained in the example: | Concentration, p.p.m. |
|---|---|
| 1 | 5 |
| 2 | 7.2 |
| 3 | 5.6 |
| 4 | 4.3 |
| 5 | 2.2 |
| 6 | 3.6 |
| 7 | 19 |
| 8 | 3.4 |
| 9 | 4.5 |
| 10 | 4.8 |
| 11 | 4.7 |
| 12 | 8 |
| 13 | 6 |
| 14 | 3.6 |
| 15 | 1.4 |

Activity against *Tetranychus telarius* by contact: The concentrations necessary to obtain a 95% death rate on a mixed population of *T. telarius* with mites at different development stages, bred on bean, with artificial light, treating the plants under standardized conditions with aqueous dispersions of active products suitably formulated, are as follows.

| Product obtained in the example: | Concentration, p.p.m. |
|---|---|
| 1 | 8 |
| 2 | 10 |
| 3 | 6.6 |
| 4 | 3.8 |
| 5 | 3.7 |
| 6 | 5 |
| 7 | 120 |
| 8 | 3.2 |
| 9 | 5.6 |
| 10 | 9 |
| 11 | 7.5 |
| 12 | 13 |
| 13 | 1.3 |
| 14 | 0.65 |
| 15 | 0.85 |

Activity against *Aphis fabae* by radical systems way: The doses necessary to obtain a 95% death rate after 6 days of parthenogenetic apter females of *A. fabae* bred with artificial light on broad bean plants having the radical apparatus dipped in an aqueous dispersion of the active product suitably formulated, and avoiding, by conventional means, any eventual systems action, are as follows.

| Product obtained in the example: | Concentration, p.p.m. |
|---|---|
| 1 | 0.47 |
| 2 | 0.45 |
| 3 | 0.3 |
| 4 | 0.4 |
| 5 | 0.4 |
| 6 | 0.3 |
| 8 | 0.6 |
| 11 | 0.2 |
| 13 | 0.56 |
| 14 | 0.4 |

Activity against eggs of *Tetranychus telarius:* The concentrations necessary to obtain a 50% non-opening of *Tetranychus telarius* eggs, laid on bean plants, by treating the same, under standardized conditions, with aqueous dispersions of the active products, suitably formulated, are as follows.

| Product obtained in the example: | Concentration, p.p.m. |
|---|---|
| 14 | 44 |
| 15 | 64 |

For products having R' different from R", the following activity tests were carried out:

Activity against domestic fly by topic application: In tests of topic application by microsyringe of an acetone solution of the active products on 5 days old domestic flies, the average percent mortalities shown in Table 1 were obtained at the 20th hour:

Table 1

| Product | Dosage, γ/fly | Percent mortality at the 20th hour | LD 50, γ/fly |
|---|---|---|---|
| N-cyanomethylamide of O-methyl-O-ethyl-dithiophosphorylacetic acid | 0.200<br>0.150<br>0.112<br>0.084 | 97<br>76<br>46<br>24 | 0.112 |
| N-ethyl-N-cyanomethylamide of O-methyl-O-ethyl-dithiophosphoryl-acetic acid | 1.77<br>1.33<br>1.00<br>0.75<br>0.56 | 100<br>77<br>48<br>23<br>6 | 1.1 |
| N-methyl-N-betacyanoethylamide of O-methyl-O-ethyldithiophosphoryl-acetic acid | 3.00<br>2.25<br>1.68<br>1.26 | 100<br>89<br>73<br>54 | 1.25 |
| N-(alpha-cyano)isopropylamide of O-methyl-O-ethyl-dithiophosphoryl-acetic acid | 4.00<br>3.00<br>2.25<br>1.68<br>1.26 | 100<br>96<br>86<br>68<br>49 | 1.3 |

Activity against *Aphis fabae:* Treating by immersion a population of parthenogenetic apter females of *Aphis fabae* on broad bean plants under standard conditions with an aqueous dispersion of the suitably formulated substances to be examined, the average percent mortalities shown in Table 2 were obtained at the 24th hour (A.S.=active substance).

Table 2

| Product | Dosage, p.p.m. of A.S. | Percent mortality at the 24th hour | LD 95, p.p.m. A.S. |
|---|---|---|---|
| N-cyanomethylamide of O-methyl-O-ethyl-dithiophosphorylacetic acid | 10.00<br>5.00<br>2.50<br>1.25<br>0.62 | 100<br>98<br>67<br>32<br>2 | 4.1 |
| N-ethyl-N-cyanomethylamide of O-methyl-O-ethyl-dithiophosphoryl-acetic acid | 10.00<br>5.00<br>2.50<br>1.25 | 100<br>81<br>32<br>4 | 7.6 |
| N-methyl-N-betacyanoethylamide of O-methyl-O-ethyldithiophosphoryl-acetic acid | 10.00<br>5.00<br>2.50<br>1.25<br>0.62 | 100<br>98<br>75<br>40<br>18 | 4.3 |
| N-(alpha-cyano)-isopropylamide of O-methyl-O-ethyldithiophosphoryl-acetic acid | 5.00<br>2.50<br>1.25<br>0.62 | 100<br>97<br>80<br>40 | 2.2 |

Activity against *Tetranychus telarius:* Treating by immersion a mixed population of adult mites on bean plants under standard conditions with an aqueous dispersion of the suitably formulated substances to be examined, the average percent mortalities reported in Table 3 were obtained at the 24th hour:

Table 3

| Products | Dosage, p.p.m. of A.S. | Percent mortality at the 24th hour | LD 95, p.p.m. of A.S. |
|---|---|---|---|
| N-cyanomethylamide of O-methyl-O-ethyl-dithiophosphorylacetic acid | 10.00<br>5.00<br>2.50<br>1.25 | 100<br>98<br>80<br>12 | 4 |
| N-ethyl-N-cyanomethylamide of O-methyl-O-ethyldithiophosphoryl-acetic acid | 10.00<br>5.00<br>2.50<br>1.25 | 100<br>98<br>71<br>15 | 4.1 |
| N-methyl-N-betacyanoethylamide of O-methyl-O-ethyldithiophosphoryl-acetic acid | 1.25<br>0.62<br>0.31<br>0.16<br>0.08 | 100<br>92<br>59<br>15<br>0 | 0.7 |
| N-(alpha-cyano)isopropylamide of O-methyl-O-ethyldithiophosphoryl-acetic acid | 2.00<br>1.00<br>0.50<br>0.25 | 100<br>95<br>64<br>13 | 1 |

The treatment of mite eggs gave the average percent mortalities reported in Table 4:

Table 4

| Products | Dosage, p.p.m. of A.S. | Percent mortality of eggs at the 6th day | LD 50, p.p.m. of A.S. |
|---|---|---|---|
| N-cyanomethylamide of O-methyl-O-ethyl-dithiophosphorylacetic acid | 1,000<br>500 | 79<br>9 | 770 |
| N-ethyl-N-cyanomethylamide of O-methyl-O-ethyldithiophosphorylacetic acid | 1,000<br>500 | 26<br>6 | >1,000 |
| N-methyl-N-betacyano-ethylamide of O-methyl-O-ethyldithiophosphoryl-acetic acid | 1,000<br>100 | 71<br>11 | 500 |
| N-(alpha-cyano)isopropylamide of O-methyl-O-ethyldithiophosphorylacetic acid | 200<br>100<br>50<br>25 | 99<br>90<br>53<br>19 | 46 |

Systemic activity by root absorption: The hypogeous portion of young bean plants infested by aphids (*Aphis fabae*) is introduced into colored glass pots containing aqueous dispersions of the product to be tested. The pots are kept under room conditions favorable to the insects for 7 days, following each day the mortality of the aphids living on the epigeous part of the plants and taking the definitive reading at the 7th day (see Table 5).

Table 5

| Products | Dosage, p.p.m. of A.S. | Percent mortality at the 7th day | LD 95, p.p.m. of A.S. |
|---|---|---|---|
| N-cyanomethylamide of O-methyl-O-ethyl-dithiophosphorylacetic acid | 0.250<br>0.125<br>0.062 | 100<br>72<br>12 | 0.2 |
| N-ethyl-N-cyanomethylamide of O-methyl-O-ethyldithiophosphoryl acetic acid | 2.00<br>1.00<br>0.50<br>0.25 | 100<br>95<br>51<br>10 | 1 |
| N-methyl-N-betacyanoethylamide of O-methyl-O-ethyl-dithiophosphoryl-acetic acid | 0.250<br>0.125<br>0.062<br>0.031 | 100<br>77<br>30<br>4 | 0.21 |
| N-(alpha-cyano)isopropylamide of O-methyl-O-ethyldithiophosphoryl acetic acid | 1.000<br>0.500<br>0.250<br>0.125<br>0.062 | 100<br>99<br>91<br>60<br>16 | 0.3 |

We claim:
1. A thiophosphate ester of the formula:

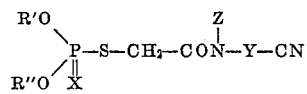

in which R' and R" are alkyl radicals each having not more than six carbon atoms, X is an atom taken from the group consisting of sulfur and oxygen, Y is a divalent saturated aliphatic hydrocarbon radical having not more than six carbon atoms, and Z is taken from the class consisting of hydrogen and alkyl radicals having not more than six carbon atoms.

2. A compound as defined in claim 1, the R', R" radicals being taken from the group consisting of methyl and ethyl, the X substituent being sulfur.

3. A compound as defined in claim 1, the R', R" radicals being taken from the group consisting of methyl and ethyl, the X substituent being oxygen.

4. N-methyl-N-cyanomethylamide of O,O-diethyldithiophosphorylacetic acid, corresponding to the formula:

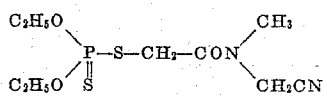

5. N-cyanomethylamide of O,O-dimethyldithiophosphorylacetic acid, corresponding to the formula:

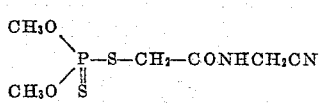

6. N-ethyl-N-cyanomethylamide of O,O-diethyldithiophosphorylacetic acid, corresponding to the formula:

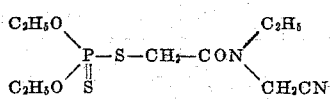

7. N-(alpha-cyano)-isopropylamide of O,O-diethyldithiophosphorylacetic acid, corresponding to the formula:

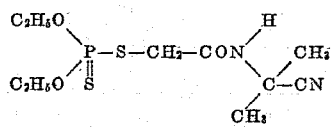

8. N-(alpha-cyano)-isopropylamide of O,O-diethyl-monothiophosphorylacetic acid, corresponding to the formula:

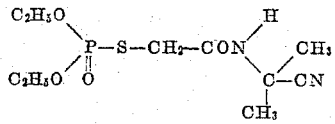

9. N-cyanomethylamide of O-methyl-O-ethyl-dithiophosphorylacetic acid.

10. N-ethyl-N-cyanomethylamide of O-methyl-O-ethyl-dithiophosphorylacetic acid.

11. N-methyl-N-betacyanoethylamide of O-methyl-O-ethyl-dithiophosphorylacetic acid.

12. N-(alpha-cyano)-isopropylamide of O-methyl-O-ethyl-dithiophosphorylacetic acid.

13. In the art of controlling insect pests in their various stages of development and their eggs, the improvement comprising applying at the locality infested by the pests a thiophosphate ester of the formula:

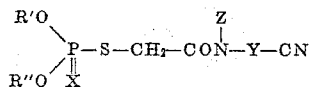

in which R' and R" are alkyl radicals each having not more than six carbon atoms, X is an atom taken from the group consisting of sulfur and oxygen, Y is a divalent saturated aliphatic hydrocarbon radical having not more than six carbon atoms, and Z is taken from the class consisting of hydrogen and alkyl radicals having not more than six carbon atoms, either as single active element or mixed with one or more known compounds taken from the class consisting of pesticides, fertilizers and carriers, said pests being taken from the class consisting of flies, aphids, and mites.

14. The invention defined in claim 13, the R', R" radicals being taken from the group consisting of methyl and ethyl, the X substituent being sulfur.

15. The invention defined in claim 13, the R', R" radicals being taken from the group consisting of methyl and ethyl, the X substituent being oxygen.

References Cited in the file of this patent

UNITED STATES PATENTS 2,494,283     Cassady et al. _____ Jan. 10, 1950